(12) United States Patent
Fukuyama et al.

(10) Patent No.: US 12,103,436 B2
(45) Date of Patent: Oct. 1, 2024

(54) VEHICLE CONTROL DEVICE

(71) Applicant: TOYOTA JIDOSHA KABUSHIKI KAISHA, Aichi-ken (JP)

(72) Inventors: Gen Fukuyama, Nagoya (JP); Mikio Inoue, Nagoya (JP); Reiko Yamamoto, Anjo (JP); Masao Tajima, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 254 days.

(21) Appl. No.: 17/686,337

(22) Filed: Mar. 3, 2022

(65) Prior Publication Data
US 2022/0348116 A1    Nov. 3, 2022

(30) Foreign Application Priority Data
Apr. 30, 2021    (JP) .................... 2021-077989

(51) Int. Cl.
| | | |
|---|---|---|
| *B60N 2/02* | (2006.01) | |
| *B60N 2/20* | (2006.01) | |
| *B60W 40/08* | (2012.01) | |
| *B60W 60/00* | (2020.01) | |

(52) U.S. Cl.
CPC .............. *B60N 2/0244* (2013.01); *B60N 2/20* (2013.01); *B60W 40/08* (2013.01); *B60W 2040/0827* (2013.01); *B60W 60/00133* (2020.02); *B60W 2420/403* (2013.01); *B60W 2540/229* (2020.02); *B60W 2552/15* (2020.02); *B60W 2552/30* (2020.02); *B60W 2552/35* (2020.02); *B60W 2556/40* (2020.02)

(58) Field of Classification Search
CPC ......... B60W 2552/15; B60W 2552/30; B60W 2552/35; B60W 40/08; B60W 60/00133; B60W 2040/0827; B60W 2540/229; B60W 2040/0818
See application file for complete search history.

(56) References Cited

U.S. PATENT DOCUMENTS 11,351,892 B1 *  6/2022  Roy ................. B60K 35/50
2005/0146186 A1   7/2005  Kinnou et al.
(Continued)

FOREIGN PATENT DOCUMENTS

CN    203876602 U  * 10/2014
JP    2003-063290 A    3/2003
(Continued)

*Primary Examiner* — Navid Z. Mehdizadeh
*Assistant Examiner* — Shelley Marie Osterhout
(74) *Attorney, Agent, or Firm* — HAUPTMAN HAM, LLP

(57) ABSTRACT

A vehicle control device includes a sleep depth estimation unit that estimates a sleep depth of an occupant seated in a seat provided in a vehicle, and a control unit that controls the vehicle such that a magnitude of the external force to be applied to at least one of a plurality of the occupants is equal to or less than a first threshold value when the estimated sleep depth of the occupant is equal to or lower than a predetermined reference depth or when the occupant is awake, and that controls the vehicle such that the magnitude of the external force to be applied to each of all the occupants is equal to or less than a second threshold value larger than the first threshold value when the sleep depth of each of the occupants is greater than the reference depth.

12 Claims, 10 Drawing Sheets

(56) References Cited

U.S. PATENT DOCUMENTS

| | | | |
|---|---|---|---|
| 2009/0108649 A1* | 4/2009 | Kneller | B64D 11/00 |
| | | | 244/129.1 |
| 2013/0161989 A1 | 6/2013 | Ito | |
| 2016/0176409 A1* | 6/2016 | Kirsch | B60N 2/02 |
| | | | 701/1 |
| 2018/0334062 A1* | 11/2018 | Park | B60N 2/504 |
| 2019/0061761 A1 | 2/2019 | Tsuchiya et al. | |
| 2020/0101936 A1 | 4/2020 | Ito et al. | |
| 2020/0307647 A1* | 10/2020 | Bader | A61B 5/4809 |
| 2020/0309549 A1 | 10/2020 | Aizawa et al. | |
| 2021/0114553 A1* | 4/2021 | Awtar | B60R 22/48 |
| 2023/0166638 A1* | 6/2023 | Kotani | G01C 21/26 |
| | | | 701/49 |
| 2023/0339368 A1* | 10/2023 | Oshima | A47C 7/50 |

FOREIGN PATENT DOCUMENTS

| | | |
|---|---|---|
| JP | 2005-199993 A | 7/2005 |
| JP | 2006-175144 A | 7/2006 |
| JP | 2006-224808 A | 8/2006 |
| JP | 2007-022263 A | 2/2007 |
| JP | 2007-261327 A | 10/2007 |
| JP | 201262020 A | 3/2012 |
| JP | 2018-177188 A | 11/2018 |
| JP | 201938356 A | 3/2019 |
| JP | 2020-055347 A | 4/2020 |
| JP | 2020-165692 A | 10/2020 |

\* cited by examiner

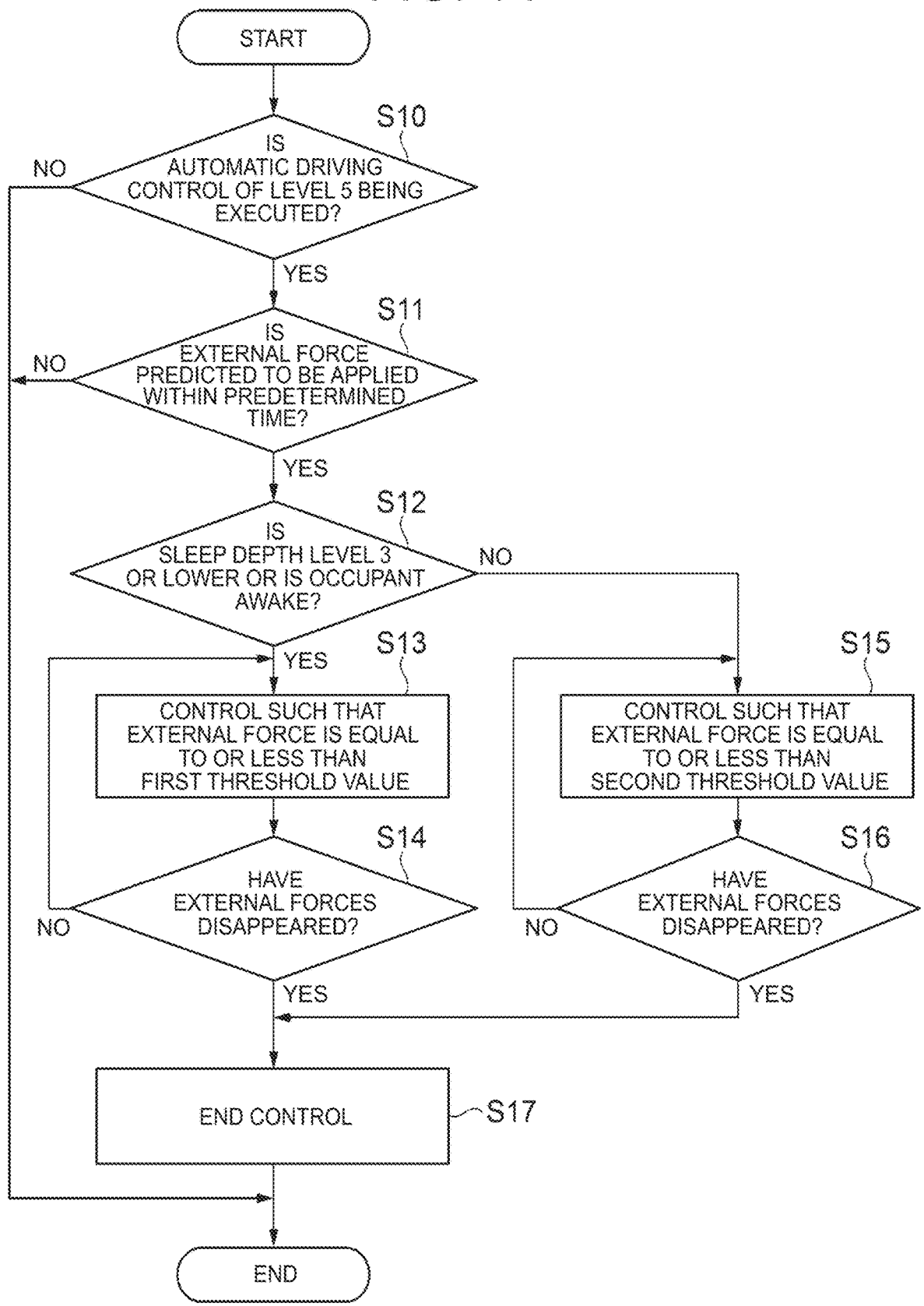

VEHICLE CONTROL DEVICE

CROSS-REFERENCE TO RELATED APPLICATION

This application claims priority to Japanese Patent Application No. 2021-077989 filed on Apr. 30, 2021, incorporated herein by reference in its entirety.

BACKGROUND

1. Technical Field

The present disclosure relates to a vehicle control device.

2. Description of Related Art

The following Japanese Unexamined Patent Application Publication No. 2019-038356 (JP 2019-038356 A) discloses an disclosure in which a state of an occupant of a vehicle is detected and an automatic driving mode of the vehicle is changed according to the state of the occupant.

SUMMARY

In JP 2019-038356 A, the automatic driving mode is changed without considering an external force to be predicted to be applied to the occupant of the vehicle in the future. Therefore, J P 2019-038356 A has room for improvement in suppressing a large external force from being applied to the occupant of the vehicle in the future due to behavior of the vehicle.

In consideration of the above fact, an object of the present disclosure is to obtain a vehicle control device capable of suppressing a large external force from being applied to an occupant due to behavior of a vehicle while a sleep depth of the occupant seated in a seat is considered.

A vehicle control device according to claim 1 includes a sleep depth estimation unit that estimates a sleep depth of an occupant seated in a seat provided in a vehicle, an external force prediction unit that predicts an external force to be applied to the occupant within a predetermined time due to behavior of the vehicle, and a control unit that controls the vehicle such that a magnitude of the external force to be applied to at least one of a plurality of the occupants is equal to or less than a first threshold value when the sleep depth of the occupant estimated by the sleep depth estimation unit is equal to or lower than a predetermined reference depth, and that controls the vehicle such that the magnitude of the external force to be applied to each of all the occupants is equal to or less than a second threshold value larger than the first threshold value when the sleep depth of each of the occupants is greater than the reference depth.

In the vehicle control device according to claim 1, the sleep depth estimation unit estimates the sleep depth of the occupant seated in the seat provided in the vehicle. Further, the external force prediction unit predicts the external force to be applied to the occupant within the predetermined time due to the behavior of the vehicle. Further, the control unit controls the vehicle such that the magnitude of the external force to be applied to the at least one of the occupants is equal to or less than the first threshold value when the sleep depth of the occupant estimated by the sleep depth estimation unit is equal to or lower than the predetermined reference depth or when the occupant is awake. Further, the control unit controls the vehicle such that the magnitude of the external force to be applied to each of all the occupants is equal to or less than the second threshold value larger than the first threshold value when the sleep depth of each of the occupants is greater than the reference depth.

As described above, the control unit of the vehicle control device according to claim 1 does not control the vehicle based on the magnitude of the external force actually applied to the occupant. That is, the control unit controls the vehicle such that the external force to be applied to the occupant is equal to or less than a predetermined threshold value while considering the external force predicted to be applied to the occupant within the predetermined time. Therefore, the vehicle control device according to claim 1 can suppress the large external force from being applied to the occupant due to the behavior of the vehicle.

Further, the control unit of the vehicle control device according to claim 1 controls the vehicle such that the magnitude of the external force to be applied to the at least one of the occupants is equal to or less than the first threshold value when the sleep depth of the occupant is equal to or lower than the reference depth or when the occupant is awake. Further, the control unit controls the vehicle such that the magnitude of the external force to be applied to each of all the occupants is equal to or less than the second threshold value larger than the first threshold value when the sleep depth of each of the occupants is greater than the reference depth. That is, the control unit controls the vehicle while considering the sleep depth of the occupant seated in the seat. Therefore, a vehicle speed to be allowed when the sleep depth of each of all the occupants is greater than the reference depth is higher than a vehicle speed to be allowed when the sleep depth is equal to or lower than the reference depth. Accordingly, when the sleep depth of each of all the occupants is greater than the reference depth, the vehicle can travel at a higher vehicle speed than when the sleep depth is equal to or lower than the reference depth.

As a result, the vehicle control device according to claim 1 can suppress the large external force due to the behavior of the vehicle from being applied to the occupant while considering the sleep depth of the occupant seated in the seat.

With the vehicle control device according to claim 2, in the vehicle control device according to claim 1, in a case where the sleep depth of the at least one of the occupants is equal to or lower than the reference depth or the occupant is awake, the control unit moves the seat in the same direction as the external force when the external force is applied to the occupant.

In the vehicle control device according to claim 2, when the sleep depth of the at least one of the occupants is equal to or lower than the reference depth or when the occupant is awake, the control unit moves the seat in the same direction as a direction of the external force to suppress the large external force from being applied to the occupant. Further, the control unit executes such control only when the sleep depth is equal to or lower than the reference depth or when the occupant is awake. Therefore, energy consumption required for controlling the vehicle can be suppressed as compared with a case where the control is executed even when the sleep depth is greater than the reference depth.

With the vehicle control device according to claim 3, in the vehicle control device according to claim 1 or 2, the external force prediction unit predicts the external force based on at least one of radius of curvature of a road, an inclination angle of the road, and an uneven portion of a road surface of the road, the radius of curvature and the inclination angle being obtained from at least one of image data obtained by capturing an image of the road on which the vehicle travels and map information including information on the road.

In the vehicle control device according to claim 3, the external force prediction unit predicts the external force to be applied to the occupant within the predetermined time based on at least one of the radius of curvature of the road and the inclination angle of the road, the radius of curvature and the inclination angle being obtained from at least one of the image data obtained by capturing an image of the road on which the vehicle travels and the map information including the information on the road. Therefore, the external force prediction unit can predict a centrifugal force (external force) to be applied to the occupant within the predetermined time based on, for example, the radius of curvature of the road. Further, the external force prediction unit can predict the external force in an extension direction (vehicle front-rear direction) of the road, the external force being applied to the occupant within the predetermined time based on the inclination angle of the road.

With the vehicle control device according to claim 4, in the vehicle control device according to claim 3, the external force prediction unit predicts a centrifugal force to be applied to the occupant as the external force based on the radius of curvature, and the control unit moves the seat in the same direction as the centrifugal force along a width direction of the vehicle.

In the vehicle control device according to claim 4, when the external force prediction unit predicts that the centrifugal force due to the radius of curvature of the road is applied to the occupant in the vehicle as the external force within the predetermined time, the control unit moves the seat in the same direction as the centrifugal force along the width direction of the vehicle. At this time, an inertial force in a direction opposite to a direction of the centrifugal force is generated in the seat, and a part of the centrifugal force is cancelled out by this inertial force. Therefore, when the vehicle travels on a curved road, the large centrifugal force (external force in the width direction of the vehicle) is suppressed from being applied to the occupant.

With the vehicle control device according to claim 5, in the vehicle control device according to claim 3 or 4, the seat includes a seat cushion on which a waist of the occupant is placed, a seat back that is rotatably supported by the seat cushion and that comes into contact with a back of the occupant, and a reclining mechanism for adjusting an angle of the seat back with respect to the seat cushion, and the external force prediction unit predicts the external force to be applied to the occupant due to the inclination angle of the road, and the control unit controls the reclining mechanism to rotate the seat back in the same direction as a direction of the external force due to the inclination angle.

In the vehicle control device according to claim 5, when the external force prediction unit predicts that the external force due to the inclination angle of the road is applied to the occupant in the vehicle within the predetermined time, the control unit rotates the seat back in the same direction as the direction of the external force due to the inclination angle of the road. At this time, an inertial force in a direction opposite to the direction of the external force is generated in the seat, and a part of the external force is cancelled out by this inertial force. Therefore, when the vehicle travels on an inclined road, the large external force due to the inclination angle is suppressed from being applied to the occupant.

With the vehicle control device according to claim 6, in the vehicle control device according to any one of claims 1 to 5, the seat includes a seat cushion on which a waist of the occupant is placed, a seat back that is rotatably supported by the seat cushion and that comes into contact with a back of the occupant, and a reclining mechanism for adjusting an angle of the seat back with respect to the seat cushion, and when the sleep depth is greater than the reference depth, the control unit controls the reclining mechanism to increase the angle between the seat back and the seat cushion as compared with a case where the sleep depth is equal to or lower than the reference depth or the occupant is awake.

In the vehicle control device according to claim 6, when the sleep depth is greater than the reference depth, the control unit controls the reclining mechanism to increase the angle between the seat back and the seat cushion as compared with a case where the sleep depth is equal to or lower than the reference depth or the occupant is awake. With this configuration, the occupant in a state of deep sleeping can easily maintain the state of deep sleeping.

As described above, the vehicle control device according to the present disclosure has excellent effects in that the large external force due to the behavior or the vehicle can be suppressed from being applied to the occupant while the sleep depth of the occupant seated in the seat is considered.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a flowchart showing a process performed by an ECU.

DETAILED DESCRIPTION OF EMBODIMENTS

Hereinafter, a vehicle control device 10 according to an embodiment of the present disclosure will be described with reference to the accompanying drawings. An arrow FR indicates a vehicle front direction, an arrow UP indicates a vehicle upward direction, and an arrow LH indicates a left side of a vehicle right-left direction (vehicle width direction). Each of the arrows is appropriately shown in each drawing. Hereinafter, when description is simply made using front-rear, right-left, and up-down directions, the front-rear direction of the vehicle front-rear direction, the right-left direction of the vehicle right-left direction (vehicle width direction), and the up-down direction of the vehicle up-down direction are shown.

Figure 1:
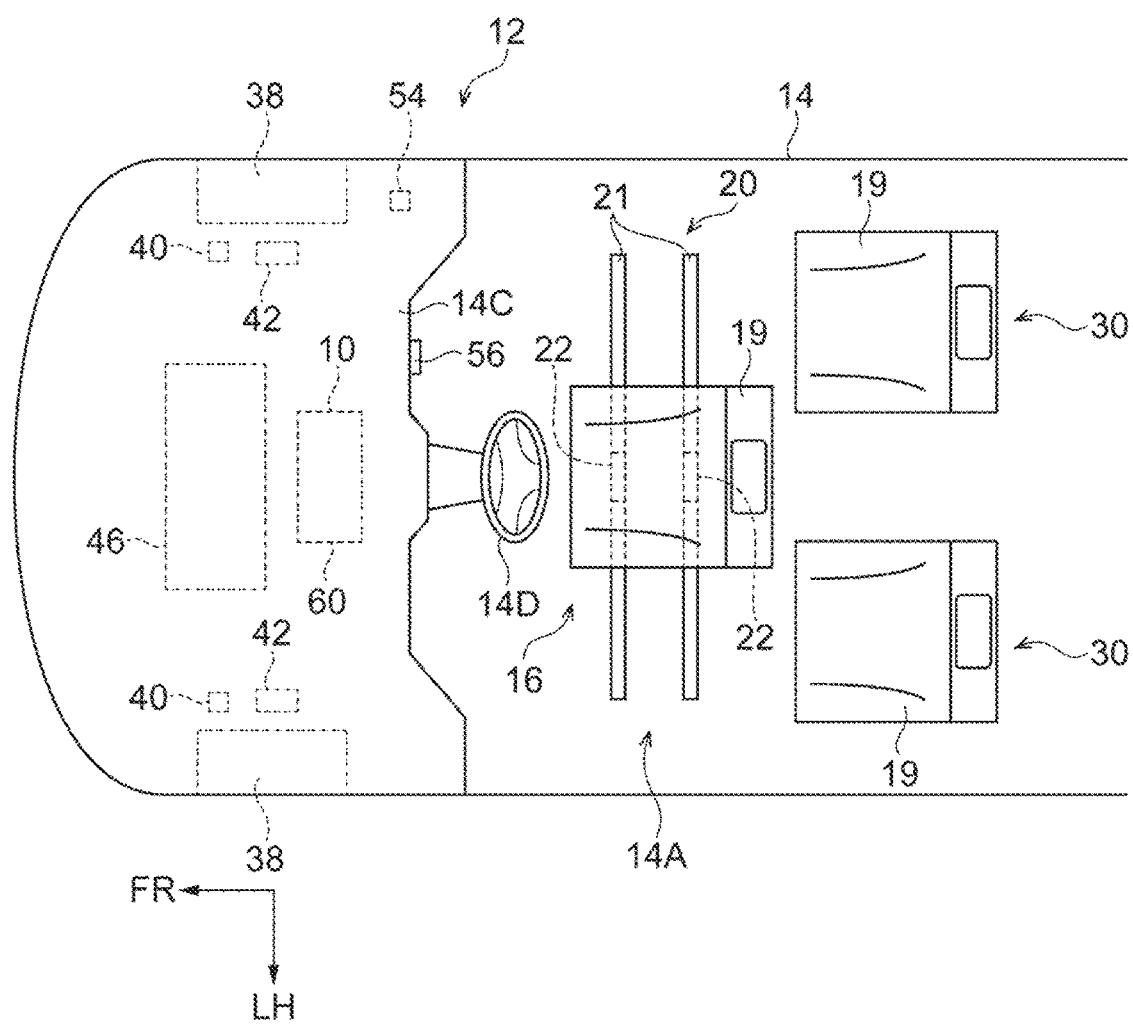
FIG. 1 is a schematic plan view showing a vehicle of which a ceiling portion is omitted and that includes a vehicle control device according to an embodiment.
Figure 2:
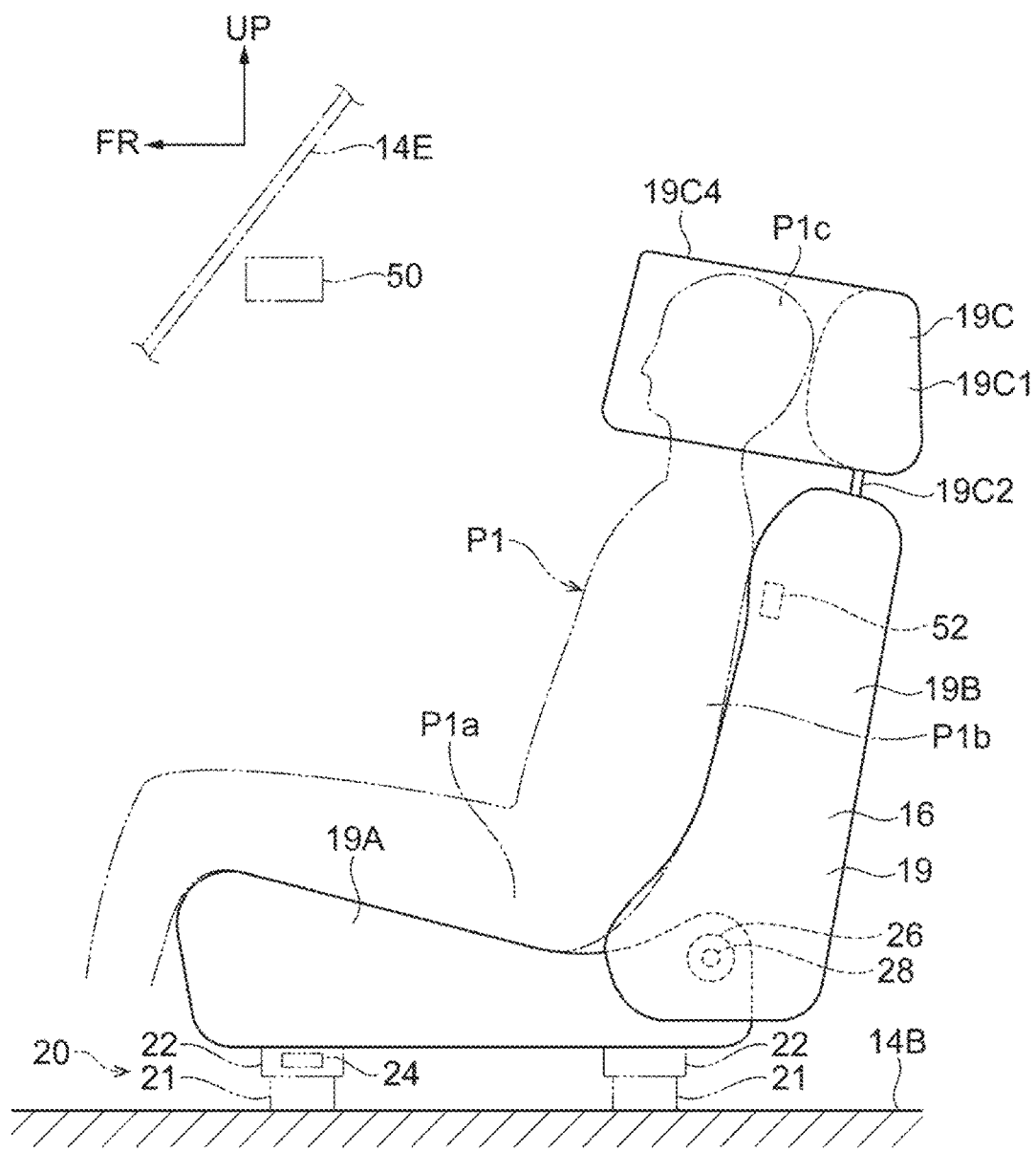
FIG. 2 is a schematic side view of a front seat and an occupant of the vehicle shown in FIG. 1.

As shown in FIG. 1, a steering wheel 14D is provided on an instrument panel 14C of a vehicle body 14 of a vehicle 12 on which the vehicle control device 10 is mounted. Further, a front seat 16 is provided in a vehicle cabin 14A. As shown in FIG. 2, an occupant P1 is seated in the front seat 16. The front seat 16 includes a seat 19 and a slide rail device 20.

As shown in FIG. 2, a floor 14B of the vehicle cabin 14A is provided with the slide rail device 20 that supports the seat 19 of the front seat 16 such that the seat 19 can be slid in the right-left direction. The slide rail device 20 includes a pair of front and rear lower rails 21 fixed to the floor 14B and extending in the right-left direction, and a pair of front and rear upper rails 22. Each of the upper rails 22 is supported by each of the lower rails 21 such that the upper rails 22 are slidable in the right-left direction. The slide rail device 20 includes a first actuator 24 composed of an electric motor and a power transmission mechanism (not shown). When the first actuator 24 generates a driving force while rotating in a normal direction, this driving force is transmitted from the power transmission mechanism to the upper rails 22, and causes the upper rails 22 to slide to the left with respect to the lower rails 21. When the first actuator 24 generates a driving force while rotating in a reverse direction, this driving force is transmitted from the power transmission mechanism to the upper rails 22, and causes the upper rails 22 to slide to the right with respect to the lower rails 21.

The seat 19 is supported by the front and rear upper rails 22. The seat 19 includes a seat cushion 19A, a seat back 19B and a headrest 19C. The seat cushion 19A is fixed to the upper ends of the front and rear upper rails 22. The rear end of the seat cushion 19A and the lower end of the seat back 19B are rotatably connected via a reclining mechanism 26. The reclining mechanism 26 is provided with a second actuator 28. When the second actuator 28 generates a driving force while rotating in the normal direction, the reclining mechanism 26 rotates by this driving force, and the seat back 19B rotates relative to the seat cushion 19A forward. When the second actuator 28 generates a driving force while rotating in the reverse direction, the reclining mechanism 26 rotates by this driving force, and the seat back 19B rotates relative to the seat cushion 19A rearward.

Figure 3:
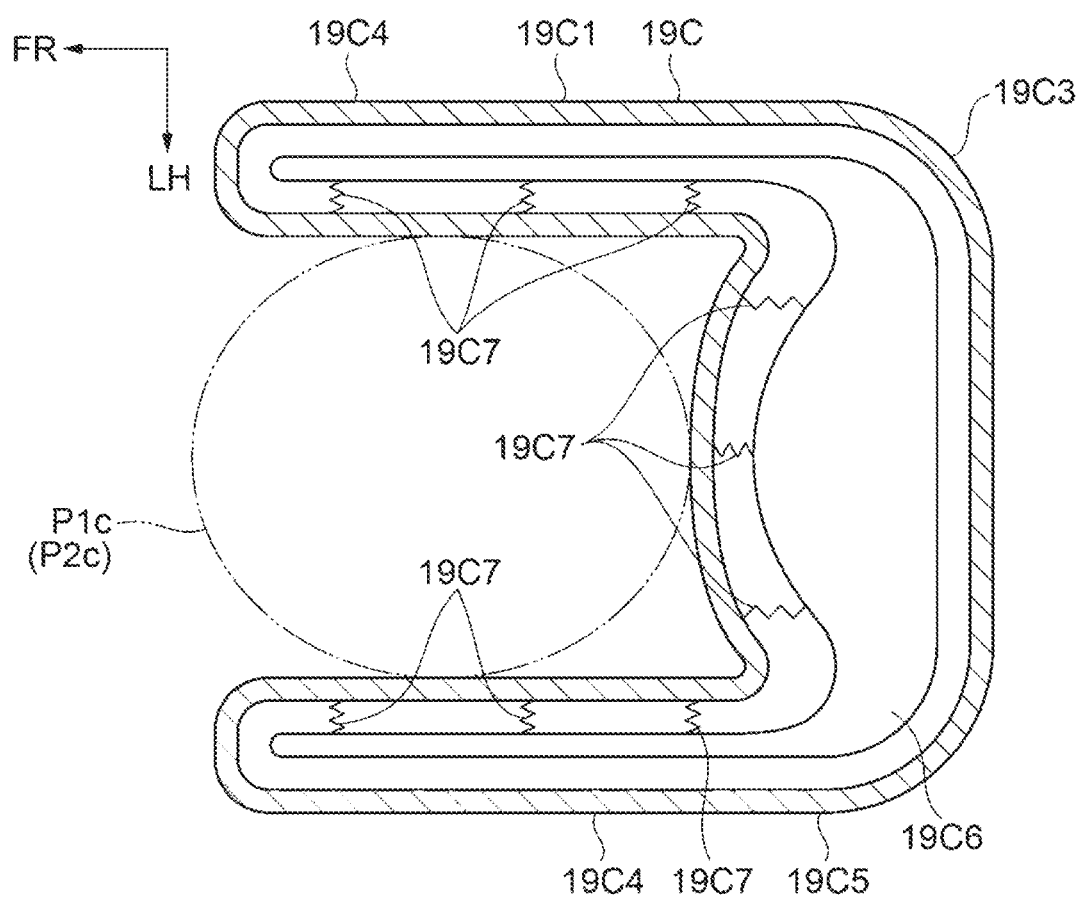
FIG. 3 is a schematic cross-sectional view of a seat headrest.

As shown in FIGS. 2 and 3, the headrest 19C includes a cushion portion 19C1 and a pair of right and left stays 19C2 whose upper ends are fixed to the cushion portion 19C1. The right and left stays 19C2 are slidably supported on the upper end of the seat back 19B in the up-down direction.

The cushion portion 19C1 includes a base portion 19C3 serving as a rear portion thereof and a pair of side portions 19C4. Each of the side portions 19C4 extends forward from each of right and left ends of the base portion 19C3. That is, the planar shape of the cushion portion 19C1 is a U-shape. The outer shape of the cushion portion 19C1 is composed of an outer skin material 19C5 having flexibility. In the internal space of the outer skin material 19C5, a bag body 19C6 having a U-shape in a plan view, a plurality of springs 19C7, and a cushion material (not shown) are provided. The bag body 19C6 is composed of a flexible material. The inside of the bag body 19C6 is filled with a liquid (not shown). One end of each spring 19C7 is supported by the bag body 19C6, and the other end of each spring 19C7 is supported by the inner peripheral surface of the outer skin material 19C5.

As shown in FIG. 1, when the occupant P1 is seated in the front seat 16 (seat 19), a waist P1a of the occupant P1 is supported by the seat cushion 19A, a back P1b of the occupant P1 is supported by the seat back 19B, and a head P1c of the occupant P1 is supported by the cushion portion 19C1. Further, as shown in FIG. 3, the rear portion and both side portions of the head P1c are surrounded by the cushion portion 19C1. For example, as shown in FIG. 3, the rear portion of the head P1c is supported by the base portion 19C3 and both side portions of the head P1c are supported by the side portions 19C4.

Figure 4:
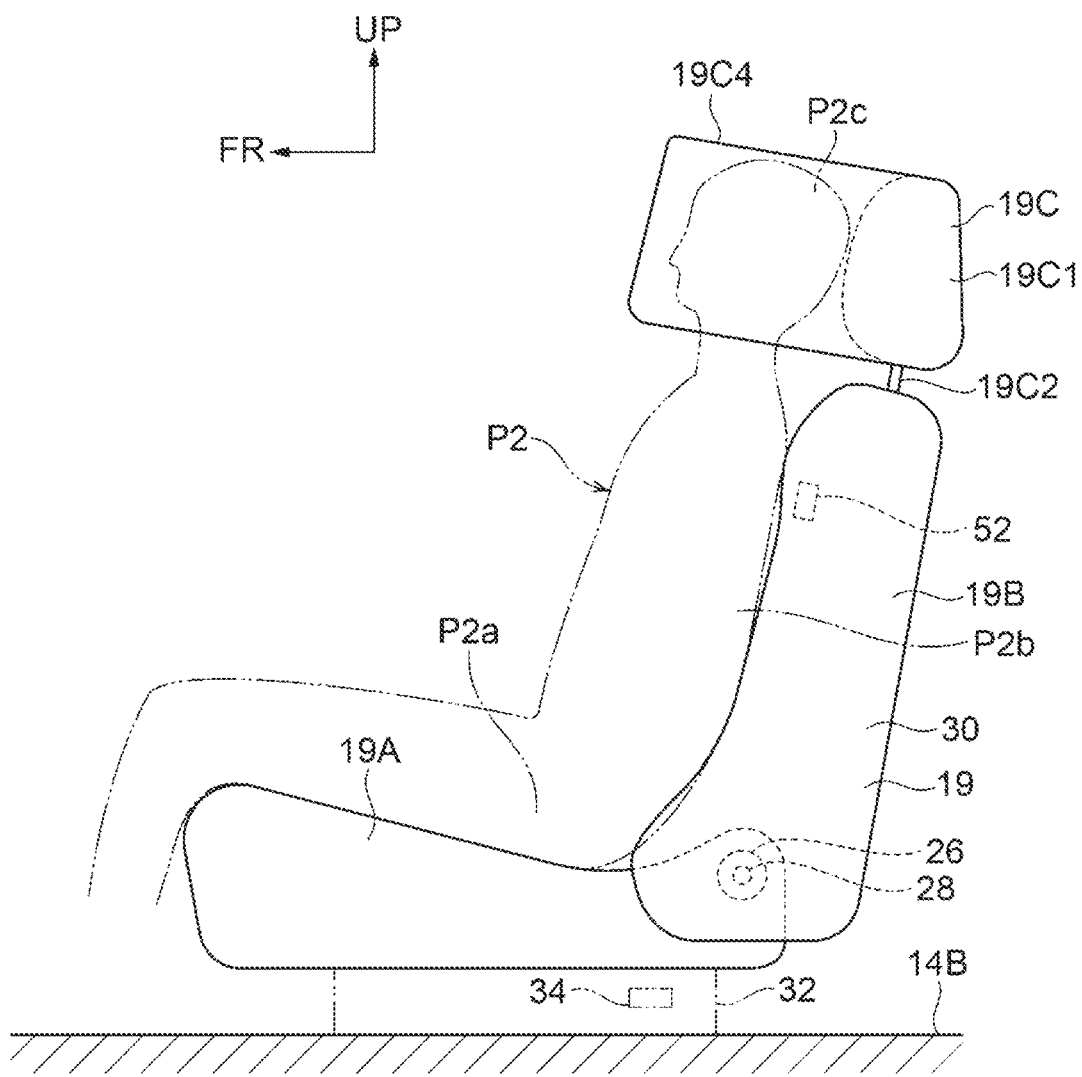
FIG. 4 is a schematic side view of a rear seat and an occupant of the vehicle shown in FIG. 1.

As shown in FIGS. 1 and 4, the floor 14B is provided with a pair of right and left rear seats 30 located rearward of the front seat 16. Each rear seat 30 includes a seat 19 and a lifter mechanism 32.

The lifter mechanism 32 provided on the floor 14B includes a third actuator 34 composed of an electric motor. In FIG. 4, the lifter mechanism 32 is schematically shown. The lifter mechanism 32 has a configuration disclosed in, for example, Japanese Unexamined Patent Application Publication No. 2012-62020 (JP 2012-62020 A). The seat cushion 19A of the seat 19 is supported on the upper end of the lifter mechanism 32. When the third actuator 34 generates a driving force while rotating in the normal direction, the driving force causes the lifter mechanism 32 to extend in the up-down direction. When the third actuator 34 generates a driving force while rotating in the reverse direction, the driving force causes the lifter mechanism 32 to shorten in the up-down direction. When the lifter mechanism 32 extends and shortens in the up-down direction, the angle of the seat cushion 19A in the side view with respect to the horizontal direction (front-rear direction) changes.

An occupant P2 is seated in the rear seat 30. When the occupant P2 is seated in the rear seat 30 (seat 19), a waist P2a of the occupant P2 is supported by the seat cushion 19A, a back P2b of the occupant P2 is supported by the seat back 19B, and a head P2c of the occupant P2 is supported by the cushion portion 19C1. Further, the rear portion and both side portions of the head P2c are surrounded by the cushion portion 19C1. For example, as shown in FIG. 3, the rear portion of the head P2c is supported by the base portion 19C3 and the both side portions of the head P2c are supported by the side portions 19C4.

Although not shown, the vehicle 12 includes three seatbelt devices each corresponding to the front seat 16 and the rear seats 30. The occupant P1 seated in the front seat 16 and the occupant P2 seated in each of the rear seat 30 wear corresponding seatbelt devices.

As shown in FIG. 1, in the vicinity of four wheels 38 provided on the vehicle 12 (only two front wheels are shown in FIG. 1), a wheel speed sensor 40 that detects the wheel speed of each wheel 38 (only two wheel speed sensors are shown in FIG. 1) is provided. Further, the vehicle 12 is provided with four brake devices 42 (only two brake devices are shown in FIG. 1) capable of applying a braking force to each wheel 38. Further, an engine 46 is provided at the front of the vehicle 12.

As shown in FIG. 2, a camera 50 is provided on the rear surface of the front windshield 14E provided on the vehicle body 14. The camera 50 can take an image of a subject located in front of the front windshield 14E.

Further, as shown in FIGS. 2 and 4, a heart rate monitor 52 is provided inside the seat back 19B of the seat 19 of each of the front seat 16 and the rear seats 30. The heart rate monitor 52 in the front seat 16 measures the heart rate of the occupant P1 seated in the front seat 16. The heart rate monitor 52 in the rear seat 30 measures the heart rate of the occupant P2 seated in the rear seat 30.

Further, as shown in FIG. 1, the vehicle 12 is provided with a Global Positioning System (GPS) receiver 54. The GPS receiver 54 acquires position information (latitude, longitude, etc.) of a point where the vehicle 12 is traveling based on a GPS signal transmitted from an artificial satellite at a predetermined cycle.

Further, the instrument panel 14C is provided with an automatic driving switch 56.

Figure 5:
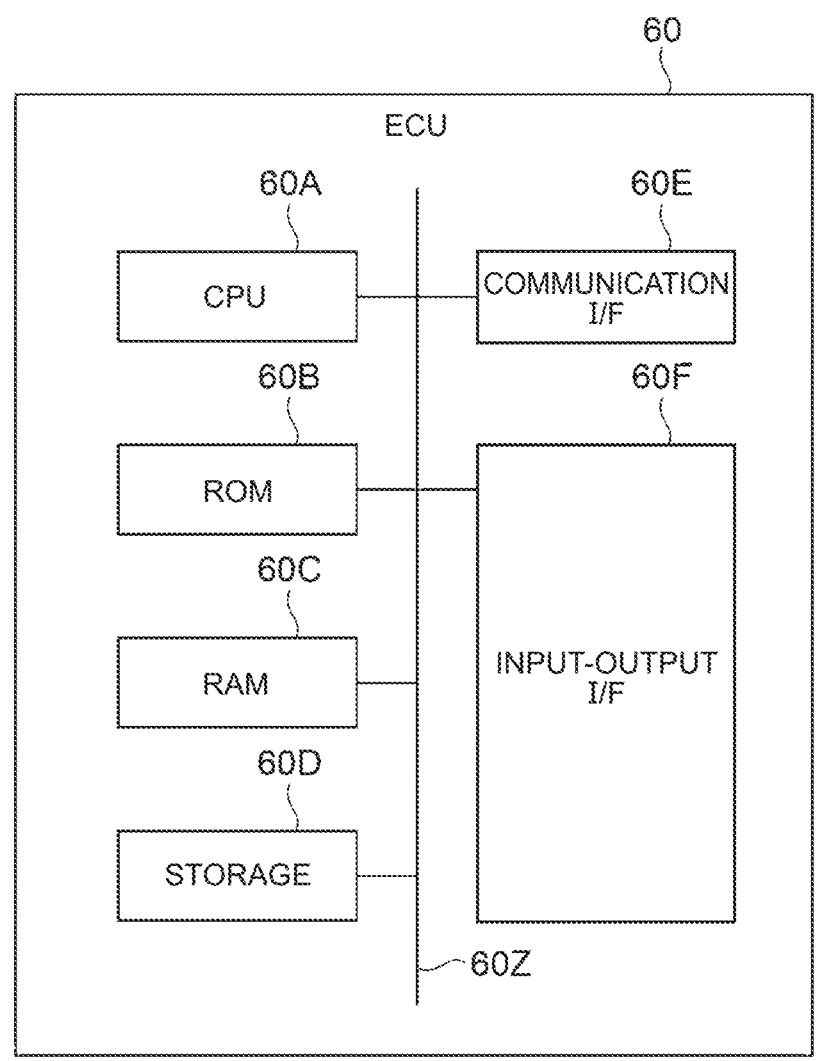
FIG. 5 is a schematic block diagram of an electronic control unit (ECU) of the vehicle shown in FIG. 1.

As shown in FIG. 1, the vehicle 12 is provided with an electronic control unit (ECU) 60. The ECU 60 is electrically connected to the first actuator 24, the second actuator 28, the third actuator 34, the wheel speed sensor 40, the brake device 42, the engine 46, the camera 50, the heart rate monitor 52, the GPS receiver 54, and the automatic driving switch 56. The ECU 60 shown in FIG. 5 is configured to include a central processing unit (CPU: processor) 60A, a read-only memory (ROM) 60B, a random access memory (RAM) 60C, a storage 60D, a communication interface (I/F) 60E, and an input-output I/F 60F. The CPU 60A, the ROM 60B, the RAM 60C, the storage 60D, the communication I/F 60E, and the input-output I/F 60F are connected so as to be able to communicate with each other via a bus 60Z. The ECU 60 can acquire information of the date and time from a timer (not shown).

The CPU 60A is a central processing unit that executes various programs and that controls various units. That is, the CPU 60A reads the program from the ROM 60B or the storage 60D and executes the program using the RAM 60C as a work area. The CPU 60A controls each configuration and performs various arithmetic processes in accordance with the program recorded in the ROM 60B or the storage 60D.

The ROM 60B stores various programs and various data. The RAM 60C temporarily stores a program or data as a work area. The storage 60D is composed of a storage device such as a hard disk drive (HDD) or a solid state drive (SSD), and stores various programs and various data. The communication I/F 60E is an interface for the ECU 60 to communicate with other devices. The input-output I/F 60F is an interface for communicating with various devices.

The vehicle 12 is equipped with a navigation system. Map data, which is part of the navigation system, is recorded in the storage 60D of the ECU 60. The GPS receiver 54 is also a part of the navigation system. The map data received by the vehicle 12 from the Web server using wireless communication via the Internet may be used as part of the navigation system.

Figure 6:
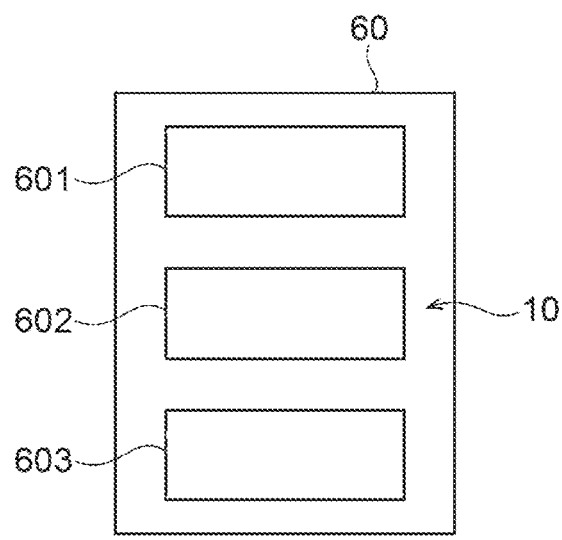
FIG. 6 is a functional block diagram of the ECU shown in FIG. 5.

As shown in FIG. 6, the ECU 60 includes a sleep depth estimation unit 601, an external force prediction unit 602, and an automatic driving control unit (control unit) 603 as functional configurations. The sleep depth estimation unit 601, the external force prediction unit 602, and the automatic driving control unit 603 are realized by the CPU 60A reading and executing the program stored in the ROM 60B or the storage 60D.

When the ECU 60 acquires data on the heart rates of the occupants P1 and P2 acquired by the heart rate monitors 52, the sleep depth estimation unit 601 estimates (detects) the sleep depths of the occupants P1 and P2 based on the data. The sleep depth estimation unit 601 according to the present embodiment estimates the sleep depth in five levels. That is, the sleep depth estimated by the sleep depth estimation unit 601 includes the sleep depths of levels 1 to 5. The sleep depth of level 1 is the depth corresponding to rapid eye movement (REM) sleep. Each of the sleep depths of levels 2 to 5 is the depth corresponding to non-rapid eye movement (Non-REM) sleep. Levels 2 and 3 correspond to the Non-REM sleep in stages 1 and 2, respectively. Levels 4 and 5 correspond to the Non-REM sleep (slow wave sleep) in stage 3 and 4, respectively.

The external force prediction unit 602 calculates (predicts) the magnitude and the direction of the external force to be applied to the occupants P1 and P2 within a predetermined time from the current time based on information acquired by the ECU 60 from the navigation system, the wheel speed sensor 40, and the camera 50. This predetermined time is, for example, 10 seconds. However, this predetermined time may be a time having a length different from 10 seconds.

Figure 7:
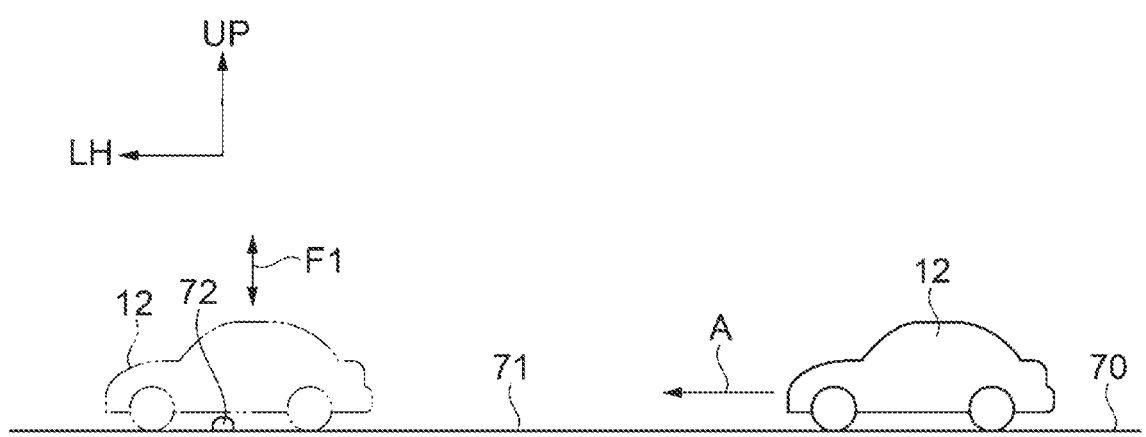
FIG. 7 is a side view showing a state in which the vehicle travels on a road including an uneven portion.

For example, as shown in FIG. 7, a case is assumed in which an uneven portion 72 existing on a road surface 71 of a road 70 in which the vehicle 12 is traveling along a traveling direction A is included in image data transmitted from the camera 50 to the ECU 60. In this case, the external force prediction unit 602 predicts an external force F1 in the up-down direction to be applied to the vehicle 12 from the road surface 71 when the wheels 38 of the vehicle 12 that maintains the vehicle speed at the current time gets over the uneven portion 72 within the predetermined time from the current time, based on information including the vehicle speed at the current time calculated based on information related to the wheel speed transmitted from the wheel speed sensor 40, the distance from the vehicle 12 to the uneven portion 72 calculated based on the image data, and the magnitude (height) of the uneven portion 72. That is, the magnitude and the direction of the external force F1 that causes the vehicle 12 to vibrate in the up-down direction are predicted.

Figure 8:
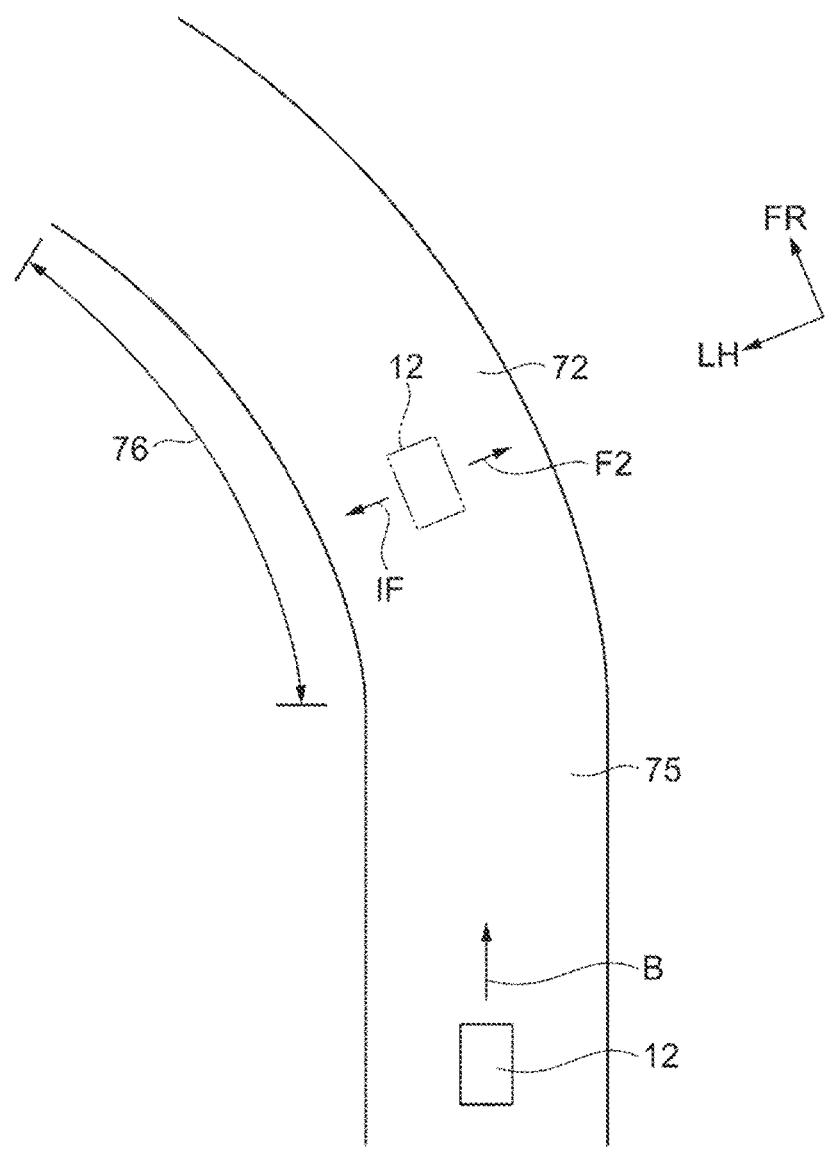
FIG. 8 is a plan view showing a state in which the vehicle travels on a road including a curved portion.

Further, as shown in FIG. 8, a case is assumed in which a curved portion 76 that is a part of a road 75 in which the vehicle 12 is traveling straight along a traveling direction B is included in the image data transmitted from the camera 50 to the ECU 60. In this case, the external force prediction unit 602 predicts, based on information including the vehicle speed at the current time and the radius of curvature of the curved portion 76, the magnitude and the direction of a centrifugal force (external force) F2 to be applied to the vehicle 12 (occupants P1 and P2) when the vehicle 12 that maintains the vehicle speed at the current time travels on the curved portion 76 within the predetermined time from the current time. The radius of curvature of the curved portion 76 can be calculated by the external force prediction unit 602 based on the image data. The external force prediction unit 602 can recognize the curved portion 76 on the road 75 and the radius of curvature of the curved portion 76 based on information acquired by the ECU 60 from the map information of the navigation system. That is, the external force prediction unit 602 can recognize the curved portion 76 on the road 75 and the radius of curvature of the curved portion 76 based on information from one of the camera 50 and the navigation system.

Figure 9:
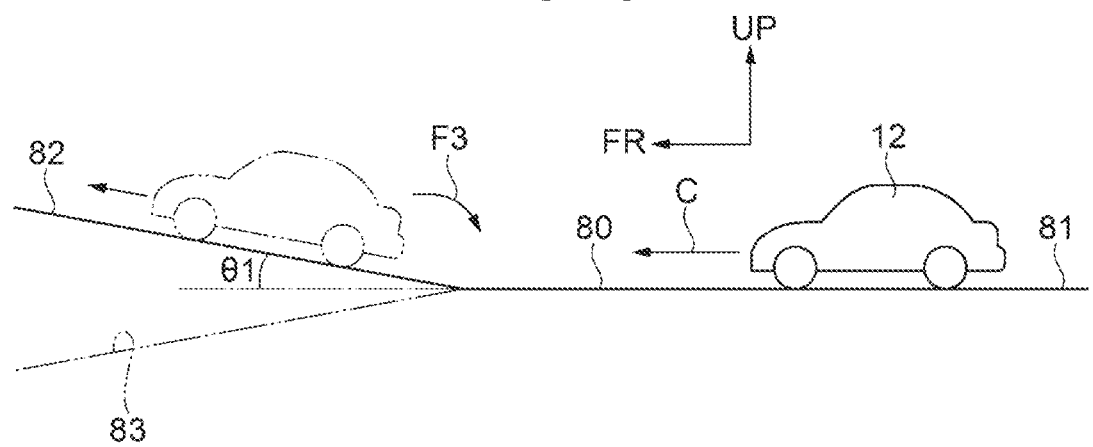
FIG. 9 is a side view showing a state in which the vehicle moves from a horizontal portion of a road to an inclined portion of the road.

Further, as shown in FIG. 9, a case is assumed in which an inclined portion (slope) 82 that is a part of a road 80 is included in the image data captured by the camera 50 and transmitted to the ECU 60 when the vehicle 12 is traveling on a horizontal portion 81 of the road 80 along a traveling direction C. In this case, the external force prediction unit 602 predicts the magnitude and the direction of an external force F3 to be applied to the vehicle 12 (occupants P1 and P2) when the vehicle 12 that maintains the vehicle speed at the current time moves from the horizontal portion 81 to the inclined portion 82 within the predetermined time from the current time based on information including the vehicle speed at the current time, an inclination angle (gradient) θ1 of the inclined portion 82, and an inclination direction of the inclined portion 82. As shown by the arrow in FIG. 9, the external force F3 is a force in a rotational direction along an extension direction (vehicle front-rear direction) of the road 80. The inclination angle θ1 and the inclination direction of the inclined portion 82 can be estimated (calculated) by the external force prediction unit 602 from the image data. The external force prediction unit 602 can recognize, based on the information acquired by the ECU 60 from the map information of the navigation system, the inclined portion 82 on the road 80 in which the vehicle 12 is traveling, and the inclination angle θ1 and the inclination direction of the inclined portion 82. That is, the external force prediction unit 602 can recognize the inclined portion 82 on the road 80 and the inclination angle θ1 and the inclination direction of the inclined portion 82 based on the information from one of the camera 50 and the navigation system.

The automatic driving control unit 603 functions when the automatic driving switch 56 located at the OFF position moves to the ON position. The automatic driving control unit 603 executes automatic driving control (driving support control) of the vehicle 12 by operating each device of the vehicle 12 including the brake device 42, the engine 46, and the steering device (not shown). The term "automatic driving" used in the present specification includes 1 to 5 levels of automatic driving defined by Society of Automotive Engineers (SAE).

Operation and Effects

Next, the operation and effects of the present embodiment will be described.

The ECU 60 of the vehicle control device 10 repeatedly executes the process of the flowchart of FIG. 14.

First, in step S10, the automatic driving control unit 603 of the ECU 60 determines whether the automatic driving control of level 5 is being executed. That is, the automatic driving control unit 603 determines whether the vehicle 12 is executing so-called fully automatic driving.

The ECU 60 that has determined Yes in step S10 proceeds to step S11. In step S11, the external force prediction unit 602 of the ECU 60 determines whether the above external force is predicted to be applied to the vehicle 12 within the predetermined time from the current time. That is, the external force prediction unit 602 determines whether at least one of the external force F1, the external force F2, and the external force F3 is applied to the vehicle 12 within the predetermined time from the current time, for example.

The ECU 60 that has determined Yes in step S11 proceeds to step S12. In step S12, the sleep depth estimation unit 601 of the ECU 60 estimates the sleep depths of the occupants P1 and P2 based on the data related to the heart rates of the occupants P1 and P2 acquired from the heart rate monitor 52. Further, the sleep depth estimation unit 601 determines whether the sleep depth of at least one of the occupant P1 and the occupant P2 is equal to or lower than a reference depth or at least one of the occupant P1 and the occupant P2 is awake. The reference depth according to the present embodiment is a sleep depth of level 3. Therefore, when the sleep depth of at least one of the occupant P1 and the occupant P2 is one of levels 1 to 3, or at least one of the occupant P1 and the occupant P2 is awake, the sleep depth estimation unit 601 determines Yes in step S12. On the other hand, when the sleep depths of all the occupants are level 4 or level 5, the sleep depth estimation unit 601 determines No in step S12.

The ECU 60 that has determined Yes in step S12 proceeds to step S13. For example, when the sleep depths of the occupants P1 and P2 are level 3 or lower, the ECU 60 proceeds to step S13.

For example, when the vehicle 12 passes through the uneven portion 72 of FIG. 7, the automatic driving control unit 603 of the ECU 60 that has proceeded to step S13 controls the brake device 42 such that the magnitude of the external force F1 to be applied to the vehicle 12 is equal to or less than a predetermined first threshold value. That is, the automatic driving control unit 603 applies the braking force from the brake device 42 to each wheel 38 to reduce the vehicle speed of the vehicle 12. Here, the first threshold value is a value obtained by multiplying a first coefficient that is "zero" or more and smaller than "one" by the magnitude of the external force F1 when the vehicle 12 passes through the uneven portion 72 at the vehicle speed of the current time. The first coefficient is recorded in the ROM 60B or the storage 60D.

The magnitude of the external force F1 in the up-down direction to be applied from the uneven portion 72 to the vehicle 12 (occupants P1 and P2) when the vehicle 12 passes through the uneven portion 72 increases as a vehicle speed when the vehicle 12 passes through the uneven portion 72 increases. Therefore, when the vehicle 12 passes through the uneven portion 72 at a speed equal to or lower than a predetermined vehicle speed, the external force F1 to be applied to the vehicle 12 is equal to or less than the first threshold value. Therefore, when the vehicle 12 passes through the uneven portion 72, there is little possibility that the occupants P1 and P2 in states of light sleeping will wake up. Further, a possibility that transition from the wake-up states of the occupants P1 and P2 to the sleeping states thereof is hindered by the vehicle 12 passing through the uneven portion 72 is reduced.

Figure 10:
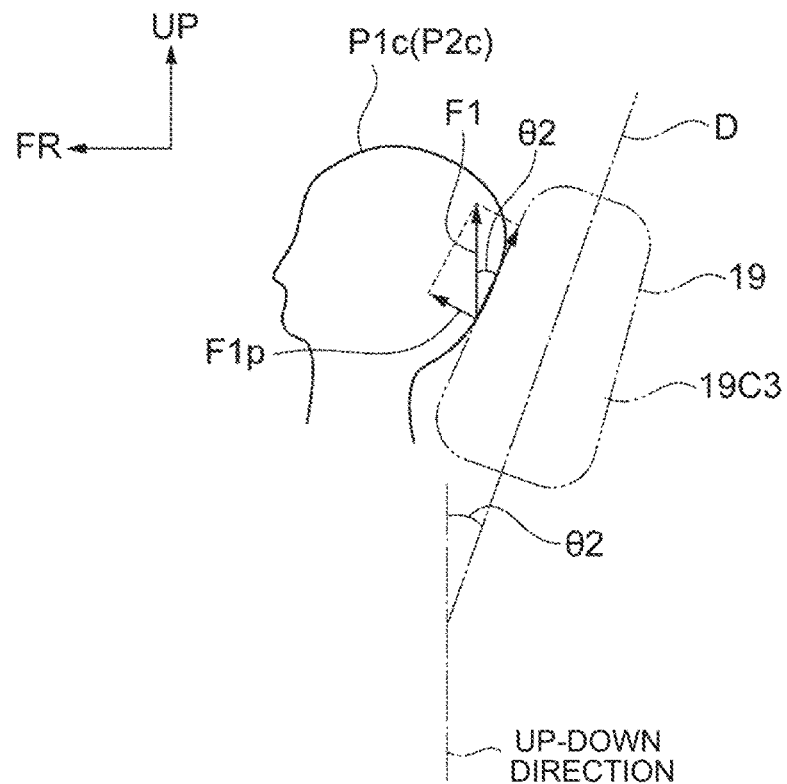
FIG. 10 is a schematic side view showing the seat headrest and a head of the occupant.

Further, when the ECU 60 performs the process of step S13, as shown in FIG. 10, the automatic driving control unit 603 may control the second actuator 28 (reclining mechanism 26) to reduce the angle θ2 between the up-down direction and an extension direction D of the seat back 19B of the seat 19 of each of the front seat 16 and the rear seats 30. As shown in FIG. 10, the external force F1 to be applied to the vehicle 12 is transmitted as a force F1p from the base portion 19C3 of the seat 19 to the heads P1c and P2c of the occupants P1 and P2. This force F1p is a value obtained by multiplying the external force F1 by sin θ2. Therefore, the smaller the value of the angle θ2 becomes, the smaller the value of the force F1p becomes. The external force to be applied to the heads P1c and P2c of the occupants P1 and P2 has a greater influence on the sleeping states of the occupants P1 and P2 than the external force to be applied to the parts other than the heads P1c and P2c of the occupants P1 and P2. Therefore, by reducing the angle θ2 between the up-down direction and the extension direction D of the seat back 19B of the seat 19 of each of the front seat 16 and the rear seats 30, when the vehicle 12 passes through the uneven portion 72, the possibility that the occupants P1 and P2 in states of light sleeping will wake up can be reduced, and the possibility that the transition from the wake-up states of the occupants P1 and P2 to the sleeping states thereof is hindered can be reduced.

Figure 11:
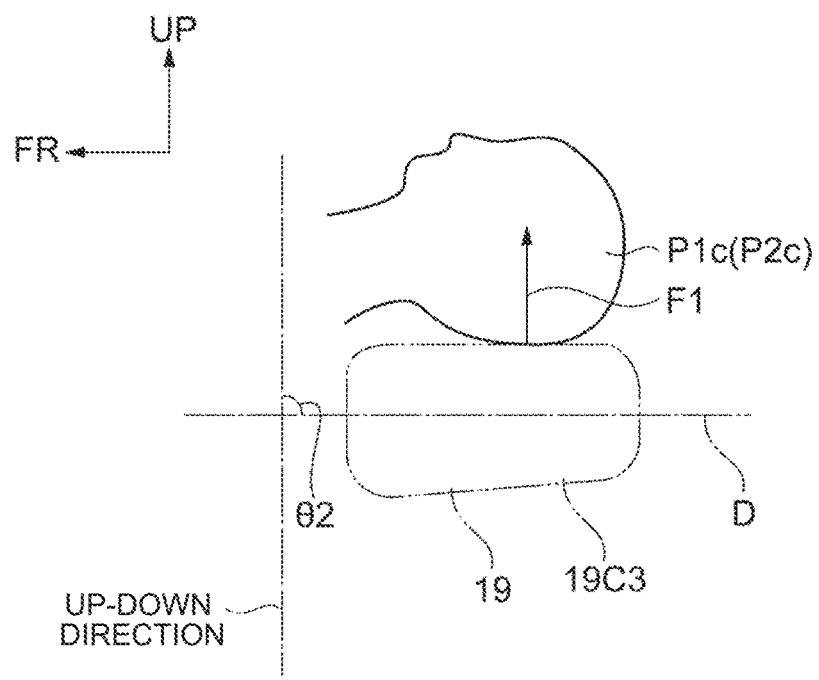
FIG. 11 is a schematic side view showing a seat headrest and a head of an occupant according to a comparative example.

FIG. 11 is a comparative example of FIG. 10. In this comparative example, when the ECU 60 performs the process of step S13, as shown in FIG. 11, the automatic driving control unit 603 controls the second actuator 28 (reclining mechanism 26) to increase the angle θ2. The angle θ2 in this case is about 90°. In this case, as shown in FIG. 11, the external force F1 to be applied to the vehicle 12 is transmitted to the heads P1c and P2c of the occupants P1 and P2 as a force having almost the same magnitude as that of the external force F1. Therefore, in this case, when the vehicle 12 passes through the uneven portion 72, the possibility that the occupants P1 and P2 in the states of light sleeping will wake up is higher than in the case of FIG. 10, and the possibility that the transition from the wake-up states of the occupants P1 and P2 to the sleeping states thereof is hindered is higher than in the case of FIG. 10.

Further, for example, when the vehicle 12 travels on the road 75 of FIG. 8, the automatic driving control unit 603 of the ECU 60 that has proceeded to step S13 controls the brake device 42 such that the external force (centrifugal force) F2 to be applied to the occupants P1 and P2 when the vehicle 12 travels on the curved portion 76 is equal to or less than the first threshold value. That is, the automatic driving control unit 603 applies the braking force from the brake device 42 to each wheel 38 to reduce the vehicle speed of the vehicle 12. The first threshold value in this case is a value obtained by multiplying the first coefficient by the magnitude of the external force F2 when the vehicle 12 passes through the curved portion 76 at the vehicle speed of the current time. The magnitude of the external force F2 when the vehicle 12 travels on the curved portion 76 is proportional to the square of the vehicle speed. Therefore, by reducing the vehicle speed when the vehicle 12 travels on the curved portion 76, the magnitude of the external force F2 to be applied to the occupants P1 and P2 when the vehicle 12 travels on the curved portion 76 is equal to or less than the first threshold value. Therefore, when the vehicle 12 passes through the curved portion 76, there is little possibility that the occupants P1 and P2 in states of light sleeping will wake up. Further, the possibility that the transition from the wake-up states of the occupants P1 and P2 to the sleeping states thereof is hindered by the vehicle 12 passing through the curved portion 76 is reduced.

Further, in step S13, the automatic driving control unit 603 controls the first actuator 24. More specifically, when the vehicle 12 travels on the curved portion 76, the first actuator 24 controlled by the automatic driving control unit 603 causes the upper rails 22 and the seat 19 of the front seat 16 to slide to the right side with respect to the lower rails 21 (width direction of the vehicle 12). Since a leftward inertial force IF (see FIG. 8) to be generated in the seat 19 by the sliding of the seat 19 to the right side is a force in a direction opposite to the direction of the external force F2, this inertial force IF is cancelled out by a part of the external force F2. Therefore, when the seat 19 is moved to the right side, the external force F2 to be applied to the occupant P1 becomes smaller.

Further, for example, when the vehicle 12 travels on the road 80 of FIG. 9, the automatic driving control unit 603 of the ECU 60 that has proceeded to step S13 controls the brake device 42 such that the external force F3 to be applied to the occupants P1 and P2 is equal to or less than the first threshold value. That is, the automatic driving control unit 603 applies the braking force from the brake device 42 to each wheel 38 to reduce the vehicle speed of the vehicle 12. The first threshold value in this case is a value obtained by multiplying the first coefficient by the magnitude of the external force F3 when the vehicle 12 moves from the horizontal portion 81 to the inclined portion 82 at the vehicle speed of the current time. The magnitude of the external force F3 when the vehicle 12 moves from the horizontal portion 81 to the inclined portion 82 increases as the vehicle speed increases. Therefore, by reducing the vehicle speed when the vehicle 12 moves from the horizontal portion 81 to the inclined portion 82, the magnitude of the external force F3 to be applied to the occupants P1 and P2 when the vehicle 12 moves from the horizontal portion 81 to the inclined portion 82 is equal to or less than the first threshold value. Therefore, when the vehicle 12 moves from the horizontal portion 81 to the inclined portion 82, there is little possibility that the occupants P1 and P2 in states of light sleeping will wake up. Further, the possibility that the transition from the wake-up states of the occupants P1 and P2 to the sleeping states thereof is hindered by the vehicle 12 moving from the horizontal portion 81 to the inclined portion 82 is reduced.

Figure 12:
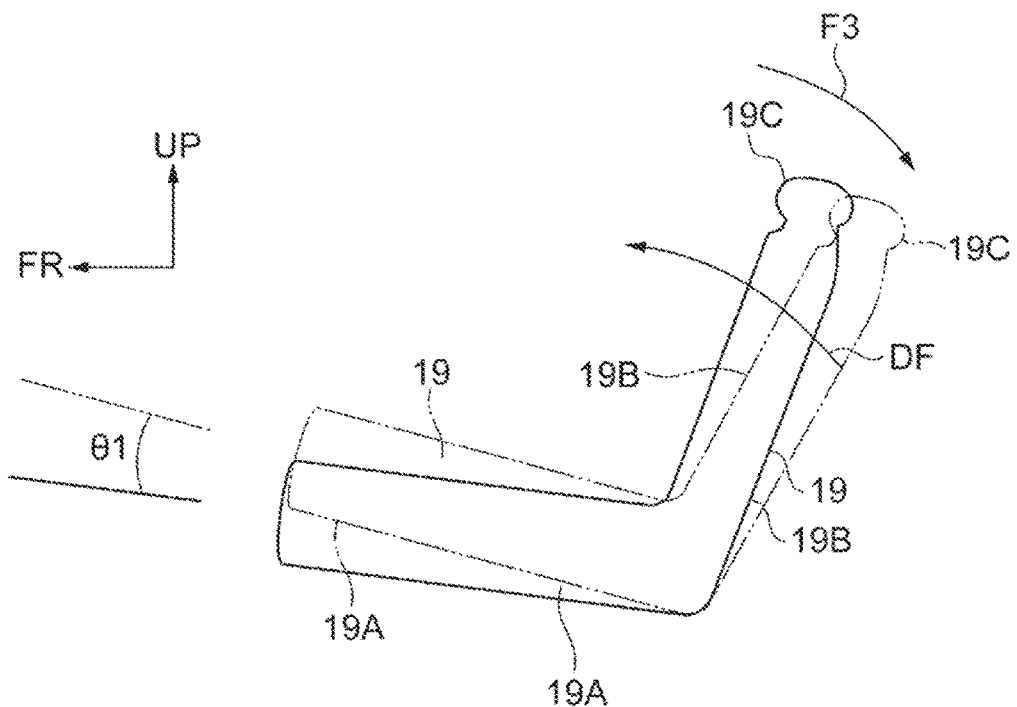
FIG. 12 is a schematic side view of a seat raised and lowered by a lifter mechanism.

Further, in step S13, the automatic driving control unit 603 may control the third actuator 34. More specifically, when the vehicle 12 moves from the horizontal portion 81 to the inclined portion 82, the third actuator 34 controlled by the automatic driving control unit 603 may drive the lifter mechanism 32 of the rear seat 30 to rotate the entire seat 19 rearward by the inclination angle θ1 along the same direction as the external force F3 as shown in FIG. 12. The seat 19 shown by the solid line in FIG. 12 shows the seat 19 of the vehicle 12 that has moved to the inclined portion 82 without operating the third actuator 34. The seat 19 shown by the virtual line in FIG. 12 shows the seat 19 of the vehicle 12 that has moved to the inclined portion 82 while operating the third actuator 34. An inertial force DF to be generated in the seat 19 when the entire seat 19 is rotated in the same direction as the external force F3 by the third actuator 34 as described above is a force in a direction opposite to the direction of the external force F3. Therefore, the inertial force DF to be generated in the seat 19 when the entire seat 19 is rotated in the same direction as the external force F3 is cancelled out by a part of the external force F3. As a result, when the entire seat 19 is rotated in the same direction as the external force F3, the external force F3 to be applied to the occupant P2 becomes smaller.

Figure 13:
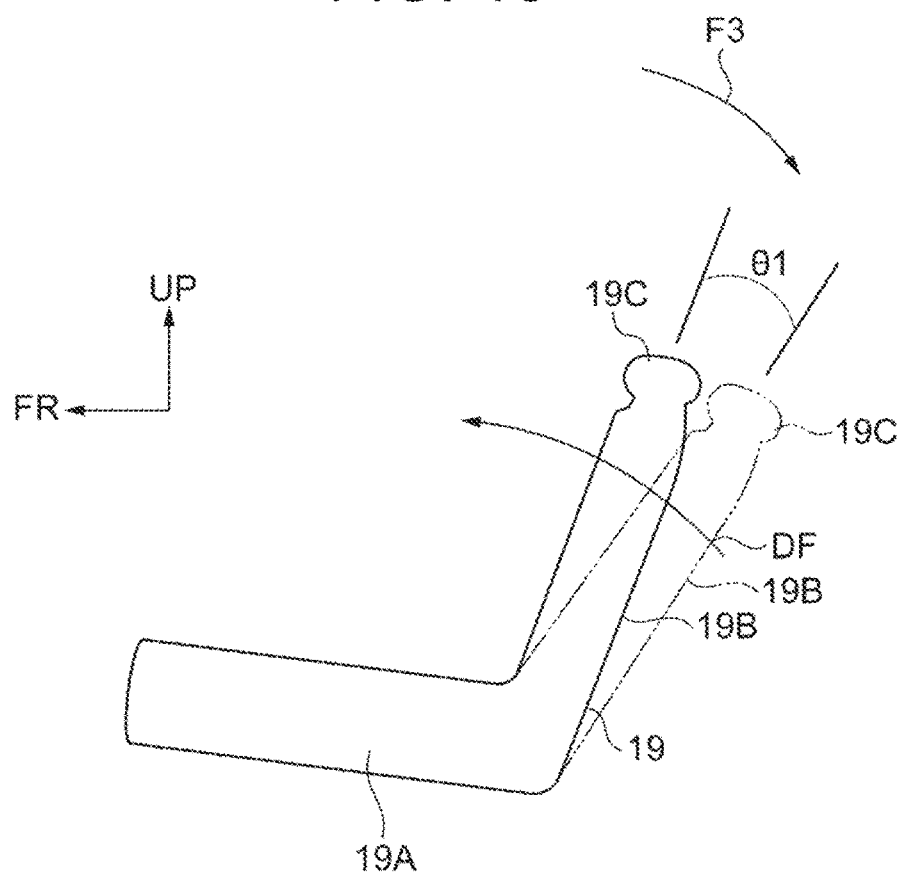
FIG. 13 is a schematic side view of the seat in which a seat back is rotated by a reclining mechanism.

The automatic driving control unit 603 may control the second actuator 28 instead of the third actuator 34. More specifically, when the vehicle 12 moves from the horizontal portion 81 to the inclined portion 82, the second actuator 28 controlled by the automatic driving control unit 603 may drive the reclining mechanism 26 of the rear seat 30 to rotate the seat back 19B rearward by the inclination angle θ1 along the same direction as the external force F3 as shown in FIG. 13. The seat back 19B shown by the solid line in FIG. 13 shows the seat back 19B of the vehicle 12 that has moved to the inclined portion 82 without operating the reclining mechanism 26. The seat back 19B shown by the virtual line in FIG. 13 shows the seat back 19B of the vehicle 12 that has moved to the inclined portion 82 while operating the reclining mechanism 26. The inertial force DF to be generated in the seat back 19B (occupant P2) when the seat back 19B is rotated in the same direction as the external force F3 by the reclining mechanism 26 as described above is cancelled out by a part of the external force F3. As a result, when the seat back 19B is rotated in the same direction as the external force F3, the external force F3 to be applied to the occupant P2 becomes smaller.

As shown by the virtual line in FIG. 9, when the road 80 includes an inclined portion 83 whose inclination direction is opposite to that of the inclined portion 82, in step S13, the automatic driving control unit 603 drives the lifter mechanism 32 and reclining mechanism 26 to rotate the seat back 19B in a direction opposite to the direction described above.

The automatic driving control unit 603 of the ECU 60 that has ended the process of step S13 proceeds to step S14 and determines whether the external forces F1, F2, and F3 have disappeared. That is, the automatic driving control unit 603 determines whether the vehicle 12 has passed through the uneven portion 72 or the curved portion 76, or the vehicle 12 that has moved to the inclined portion 82 has traveled on the inclined portion 82 by a predetermined distance, based on the position information obtained from the navigation system or the image data received from the camera 50.

The ECU 60 that has determined Yes in step S14 proceeds to step S17, and ends the control executed by the automatic driving control unit 603 in step S13. That is, the automatic driving control unit 603 controls the engine 46 (at least one of the opening degree of a throttle valve and the injection amount of fuel) to return the vehicle speed of the vehicle 12 to the vehicle speed before the process of step S13 is executed. Further, the automatic driving control unit 603 returns the upper rails 22 and the seat 19 (seat back 19B) to the positions before the process of step S13 is executed.

On the other hand, when the determination result is No in step S14, the ECU 60 returns to step S13. That is, the automatic driving control unit 603 continues the control executed in step S13.

On the other hand, when the determination result is No in step S12, the ECU 60 proceeds to step S15. That is, when the sleep depths of all the occupants P1 and P2 are level 4 or level 5, the ECU 60 proceeds to step S15.

The process performed by the ECU 60 in step S15 is similar to the process performed by the ECU 60 in step S13. However, the automatic driving control unit 603 of the ECU 60 that has proceeded to step S15 controls the brake device 42 such that the magnitude of the external force F1 to be applied to the vehicle 12 when the vehicle 12 passes through the uneven portion 72 of FIG. 7, the magnitude of the external force F2 when the vehicle 12 travels on the curved portion 76 of FIG. 8, and the magnitude of the external force F3 when the vehicle 12 moves from the horizontal portion 81 to the inclined portion 82 of FIG. 9 are equal to or less than a predetermined second threshold value. That is, the automatic driving control unit 603 applies the braking force from the brake device 42 to each wheel 38 to reduce the vehicle speed of the vehicle 12. Here, the second threshold value of the external force F1 is obtained by multiplying a second coefficient that is larger than "zero" and smaller than "one" by the magnitude of the external force F1 when the vehicle 12 passes through the uneven portion 72 at the vehicle speed of the current time, and is larger than the first threshold value of the external force F1. Similarly, the second threshold value of the external force F2 is a value obtained by multiplying the second coefficient by the magnitude of the external force F2 when the vehicle 12 travels on the curved portion 76 at the vehicle speed of the current time, and is larger than the first threshold value of the external force F2. Similarly, the second threshold value of the external force F3 is a value obtained by multiplying the second coefficient by the magnitude of the external force F3 when the vehicle 12 moves from the horizontal portion 81 to the inclined portion 82 at the vehicle speed of the current time, and is larger than the first threshold value of the external force F3. That is, the second coefficient is larger than the first coefficient. The second coefficient is recorded in the ROM 60B or the storage 60D. Since the second coefficient is larger than the first coefficient, deceleration of the vehicle 12 in step S15 is smaller than deceleration of the vehicle 12 in step S13.

The automatic driving control unit 603 of the ECU 60 that has ended the process of step S15 proceeds to step S16 and determines whether the external forces F1, F2, and F3 have disappeared.

The ECU 60 that has determined Yes in step S16 proceeds to step S17, and ends the control executed by the automatic driving control unit 603 in step S15.

On the other hand, when the determination result is No in step S16, the ECU 60 returns to step S15. That is, the automatic driving control unit 603 continues the control executed in step S15.

When the ECU 60 ends the process of step S17, or the determination result is NO in steps S10 and S11, the ECU 60 temporarily ends the process of the flowchart of FIG. 14.

In the vehicle control device 10 according to the present embodiment described above, the automatic driving control unit 603 of the ECU 60 controls the vehicle 12 such that the external forces F1, F2, and F3 are equal to or less than the predetermined threshold value while considering the external forces F1, F2, and F3 that are predicted to be applied to the occupants P1 and P2 within the predetermined time. That is, the vehicle control device 10 does not control the vehicle 12 based on the magnitudes of the external forces F1, F2, and F3 that are actually generated. Therefore, the vehicle control device 10 can suppress the large external forces F1, F2, and F3 from being applied to the occupants P1 and P2 due to the behavior of the vehicle 12.

Further, when the sleep depth of at least one of the occupant P1 and the occupant P2 is equal to or lower than the reference depth or at least one of the occupant P1 and the occupant P2 is in the wake-up state, the automatic driving control unit 603 controls the vehicle 12 such that the magnitudes of the external forces F1, F2 and F3 to be applied to the occupants P1 and P2 are equal to or less than the first threshold value. On the other hand, when the sleep depths of all the occupants P1 and P2 are greater than the reference depth, the automatic driving control unit 603 controls the vehicle 12 such that the magnitudes of the external forces F1, F2, and F3 to be applied to the occupants P1 and P2 are equal to or less than the second threshold value larger than the first threshold value. That is, the ECU 60 of the vehicle control device 10 controls the vehicle 12 while considering the sleep depths of the occupants P1 and P2. Further, the second threshold value that is a threshold value to be adopted when the sleep depths of the occupants P1 and P2 are greater than the reference depth is larger than the first threshold value that is a threshold value to be adopted when the sleep depths of the occupants P1 and P2 are equal to or lower than the reference depth or the occupants P1 and P2 are in the wake-up states. That is, the vehicle speed to be allowed when the sleep depths of the occupants P1 and P2 are great is higher than the vehicle speed to be allowed when the sleep depths are low. Therefore, when the sleep depths of the occupants P1 and P2 are great, the vehicle 12 can travel at a higher vehicle speed than when the sleep depths are low.

Therefore, the vehicle control device 10 according to the present embodiment can suppress the large external forces F1, F2, and F3 from being applied to the occupants P1 and P2 due to the behavior of the vehicle 12 while considering the sleep depths of the occupants P1 and P2 seated on the seat 19.

Further, the headrest 19C of each seat 19 includes the base portion 19C3 and the pair of side portions 19C4. As shown in FIG. 3, the rear surface of each of the heads P1c and P2c is supported by the base portion 19C3 and the both side surfaces of each of the heads P1c and P2c are supported by the side portions 19C4. Therefore, forces due to the external forces F1, F2, and F3 are dispersed more widely to be transmitted from the headrest 19C to the heads P1c and P2c than when the headrest 19C does not include the side portions 19C4. Therefore, when the forces due to the external forces F1, F2, and F3 are applied to the heads P1c and P2c, an influence of the forces on the sleeping states of the occupants P1 and P2 can be reduced as compared with a case where the headrest 19C does not include the side portions 19C4.

Further, the headrest 19C includes the bag body 19C6 filled with a liquid and the springs 19C7. This bag body 19C6 functions as a damper. Further, when the forces due to the external forces F1, F2, and F3 are applied from the headrest 19C to the heads P1c and P2c, the springs 19C7 are elastically deformed. Therefore, when the forces due to the external forces F1, F2, and F3 are applied to the heads P1c and P2c, an influence of the external forces F1, F2, and F3 on the sleeping states of the occupants P1 and P2 can be reduced as compared with a case where the headrest 19C does not include the bag body 19C6 and the springs 19C7.

Further, in the vehicle control device 10, when the sleep depth of the occupant P1 is equal to or lower than the reference depth or when the occupant P1 is in the wake-up state, the automatic driving control unit 603 of the ECU 60 uses the slide rail device 20 and the first actuator 24 to move the front seat 16 in the same direction as the external force F2 and suppress the large external force F2 from being applied to the occupant P1.

Further, when the external force prediction unit 602 predicts that the external force F3 due to the inclination angle θ1 of the road 80 will be applied to the occupant P2 in the vehicle 12 within the predetermined time from the current time, the vehicle control device 10 rotates the seat 19 (or seat back 19B) in the same direction as a direction of the external force F3 due to the inclination angle θ1. Therefore, when the vehicle 12 moves from the horizontal portion 81 of the road 80 to the inclined portion 82 of the road 80, it is possible to suppress the large external force due to the inclination angle θ1 from be applied to the occupant P2.

Further, the automatic driving control unit 603 executes these controls for moving the seat 19 in the same direction as the external forces F2 and F3 only when the sleep depths of the occupants P1 and P2 are equal to or lower than the reference depth or the occupants P1 and P2 are in the wake-up states. Therefore, energy consumption required for controlling the vehicle 12 can be suppressed as compared with a case where these controls are executed even when the sleep depth is greater than the reference depth.

Although the vehicle control device 10 according to the embodiment has been described above, the design of the vehicle control device 10 can be appropriately changed without departing from the scope of the present disclosure.

For example, when the sleep depth is greater than the reference depth, the automatic driving control unit 603 may increase the angle between the seat cushion 19A and the seat back 19B as compared with a case where the sleep depth is equal to or lower than the reference depth, by controlling the reclining mechanism 26 (first actuator 24) to rotate the seat back 19B rearward. With this configuration, the occupants P1 and P2 in states of deep sleeping can easily maintain the states of deep sleeping.

Further, various types and magnitudes of an external force applied to a vehicle having the same specifications as the vehicle 12 (not shown) when the vehicle travels on various roads may be stored in an external server with which the vehicle 12 can communicate, together with position information indicating a location where the external force is generated and a vehicle speed when the external force is generated. In this case, when the vehicle 12 accesses the external server, the external force prediction unit 602 of the ECU 60 can determine whether the external force is applied to the vehicle 12 within a predetermined time from the current time. Further, the external force prediction unit 602 can recognize the maximum value of the vehicle speed for setting the magnitude of the external force predicted to be applied to the vehicle 12 within the predetermined time from the current time to a value equal to or less than a predetermined value (for example, the first threshold value and the second threshold value) more accurately than the above embodiment. Therefore, in the vehicle 12 according to the modification, the magnitude of the external force can be set to the value equal to or less than the predetermined value while the vehicle speed is increased as compared with the above embodiment.

The slide rail device 20 may be omitted from the front seat 16. Further, the lifter mechanism 32 may be provided on the front seat 16.

The lifter mechanism 32 may be omitted from the rear seat 30. Further, the slide rail device 20 may be provided on the rear seat 30.

The heart rate monitor 52 may be omitted from the seat 19, and the occupants P1 and P2 may wear a wearable device capable of measuring the heart rates of the occupants P1 and P2 and wirelessly transmitting the acquired heart rate data to the ECU 60.

Further, the heart rate monitor 52 may be omitted from the seat 19, and the vehicle 12 may be provided with an in-vehicle camera capable of capturing the faces of the occupants P1 and P2. Image data captured by the in-vehicle camera is sent to the ECU 60 and analyzed by the sleep depth estimation unit 601. The sleep depth estimation unit 601 determines the sleep depth based on the states of the eyes, etc. of the occupants P1 and P2 included in the image data. For example, the sleep depth estimation unit 601 measures the degree to which the eyelids of the occupants P1 and P2 are open and the cycle of opening and closing the eyelids from the images of surrounding portions of the eyes of the occupants P1 and P2. Further, the automatic driving control unit 603 estimates the sleep depths of the occupants P1 and P2 based on the measured degree to which the eyelids of the occupants P1 and P2 are open and the measured cycle of opening and closing the eyelids.

In step S15, similarly to step S13, the ECU 60 may control at least one of the first actuator 24, the second actuator 28, and the third actuator 34.

When the automatic driving level is one of levels 1 to 4 or when the automatic driving switch 56 is in the OFF position, the ECU 60 may execute the process of the flowchart of FIG. 14 (excluding step S10).

The present disclosure may be applied to a vehicle in which automatic driving control cannot be performed.

When the external force prediction unit 602 predicts that the external forces F1, F2, and F3 having magnitudes equal to or larger than the predetermined value will not be applied within a predetermined time from the current time, and the sleep depth estimation unit 601 determines that the sleep depths of all the occupants P1 and P2 are greater than the reference depth, as shown in FIG. 11, the automatic driving control unit 603 may control the second actuator 28 (reclining mechanism 26) to set the angle θ2 to about 90°. That is, the angle θ2 may be increased as compared with a case where the sleep depth is equal to or lower than the reference depth. With this configuration, the occupant in a state of deep sleeping can easily maintain the state of deep sleeping.

Further, the seat 19 may include a device for adjusting the amount of liquid in the bag body 19C6 based on at least one of the sleep depth of the occupant and the magnitudes of the external forces F1, F2, and F3. This device adjusts the amount of liquid such that the bag body 19C6 exerts an appropriate damper effect according to the sleep depth of the occupant and the magnitudes of the external forces F1, F2, and F3. When the present disclosure is carried out according to the embodiment in the modification, an influence of the external forces F1, F2 and F3 on the sleeping states of the occupants P1 and P2 becomes smaller.

What is claimed is:

1. A vehicle control device comprising:
    a processor configured to
        estimate a sleep depth of each of a plurality of occupants seated in a seat provided in a vehicle;
        predict an external force to be applied to at least one of the plurality of occupants within a predetermined time due to behavior of the vehicle; and
        control the vehicle such that
            a magnitude of the external force to be applied to the at least one of the plurality of the occupants is equal to or less than a first threshold value in response to (i) the estimated sleep depth of the at least one occupant being equal to or lower than a predetermined reference depth or (ii) the at least one occupant being awake, and
            the magnitude of the external force to be applied to each of all of the plurality of occupants is equal to or less than a second threshold value larger than the first threshold value in response to the estimated sleep depth of each of all of the plurality of occupants being greater than the predetermined reference depth,
    wherein the processor is further configured to, in response to predicting the external force to be applied to the at least one of the plurality of occupants within the predetermined time due to the behavior of the vehicle, estimate the sleep depth of each of the plurality of occupants seated in the seat provided in the vehicle.

2. The vehicle control device according to claim 1, wherein
    the processor is further configured to, in response to the estimated sleep depth of the at least one occupant being equal to or lower than the predetermined reference depth or the at least one occupant being awake, move the seat in a same direction as the external force when the external force is applied to the at least one occupant.

3. The vehicle control device according to claim 1, wherein
    the processor is further configured to predict the external force based on at least one of radius of curvature of a road, an inclination angle of the road, or an uneven portion of a road surface of the road, the radius of curvature and the inclination angle being obtained from at least one of image data obtained by capturing an image of the road on which the vehicle travels and map information including information on the road.

4. The vehicle control device according to claim 3, wherein
    the processor is further configured to
        predict a centrifugal force to be applied to the at least one occupant as the external force based on the radius of curvature; and
        move the seat in a same direction as the centrifugal force along a width direction of the vehicle.

5. The vehicle control device according to claim 3, wherein
    the seat includes
        a seat cushion configured to support a waist of the occupant,
        a seat back that is rotatably supported by the seat cushion and is configured to contact with a back of the occupant, and
        a reclining mechanism for adjusting an angle of the seat back with respect to the seat cushion, and
    the processor is further configured to
        predict the external force to be applied to the at least one occupant due to the inclination angle of the road; and
        control the reclining mechanism to rotate the seat back in a same direction as a direction of the external force due to the inclination angle.

6. The vehicle control device according to claim 1, wherein
    the seat includes
        a seat cushion configured to support a waist of the occupant,
        a seat back that is rotatably supported by the seat cushion and is configured to contact with a back of the occupant, and
        a reclining mechanism for adjusting an angle of the seat back with respect to the seat cushion, and
    the processor is further configured to, in response to the estimated sleep depth of each of the plurality of occupants being greater than the predetermined reference depth, control the reclining mechanism to increase the angle between the seat back and the seat cushion as compared with a case where the estimated sleep depth of the at least one occupant is equal to or lower than the predetermined reference depth or the at least one occupant is awake.

7. The vehicle control device according to claim 1, wherein
    the processor is further configured to, in response to the estimated sleep depth of each of the plurality of occupants being greater than the predetermined reference depth, control the vehicle such that the magnitude of the external force to each of all of the plurality of occupants is equal to or less than the second threshold value larger than the first threshold value, while allowing the magnitude of the external force to be larger than the first threshold value.

8. The vehicle control device according to claim 1, wherein
    the processor is further configured to control a brake device of the vehicle such that the magnitude of the external force to be applied to the at least one of the plurality of occupants is equal to or less than the second threshold value greater than the first threshold value.

9. The vehicle control device according to claim 8, wherein
    the processor is further configured to predict the external force based on at least one of radius of curvature of a road, an inclination angle of the road, or an uneven portion of a road surface of the road, the radius of curvature and the inclination angle being obtained from at least one of image data obtained by capturing an image of the road on which the vehicle travels and map information including information on the road.

10. The vehicle control device according to claim 9, wherein
the processor is further configured to
predict a centrifugal force to be applied to the at least one occupant as the external force based on the radius of curvature; and
move the seat in a same direction as the centrifugal force along a width direction of the vehicle.

11. The vehicle control device according to claim 10, wherein
the seat includes
a seat cushion configured to support a waist of the occupant,
a seat back that is rotatably supported by the seat cushion and is configured to contact with a back of the occupant, and
a reclining mechanism for adjusting an angle of the seat back with respect to the seat cushion, and
the processor is further configured to
predict the external force to be applied to the at least one occupant due to the inclination angle of the road; and
control the reclining mechanism to rotate the seat back in a same direction as a direction of the external force due to the inclination angle.

12. The vehicle control device according to claim 11, wherein
the processor is further configured to, in response to the estimated sleep depth of each of the plurality of occupants being greater than the predetermined reference depth, control the reclining mechanism to increase the angle between the seat back and the seat cushion as compared with a case where the estimated sleep depth of the at least one occupant is equal to or lower than the predetermined reference depth or the at least one occupant is awake.

* * * * *